US009819665B1

(12) United States Patent
Machani

(10) Patent No.: US 9,819,665 B1
(45) Date of Patent: *Nov. 14, 2017

(54) SYNCHRONIZATION OF ACCESS TOKENS FOR SESSION CONTINUITY ACROSS MULTIPLE DEVICES

(71) Applicant: EMC IP Holding Company LLC, Hopkinton, MA (US)

(72) Inventor: Salah Machani, Toronto (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/752,530

(22) Filed: Jun. 26, 2015

(51) Int. Cl.
H04L 9/00 (2006.01)
H04L 29/06 (2006.01)
H04L 9/32 (2006.01)
H04L 9/08 (2006.01)

(52) U.S. Cl.
CPC ............... H04L 63/08 (2013.01); H04L 9/08 (2013.01); H04L 9/3234 (2013.01); H04L 63/102 (2013.01)

(58) Field of Classification Search
CPC . H04L 63/0807; H04L 9/3234; H04L 9/3213; H04L 9/3268; H04L 9/3263; H04L 63/0823; H04L 63/0853; H04L 63/08; H04L 63/102; H04L 9/08; G06F 21/33
USPC .................. 713/156, 158; 726/4, 6, 7, 8–10
See application file for complete search history.

(56) References Cited

U.S. PATENT DOCUMENTS

| 8,151,116 | B2* | 4/2012 | van der Horst | G06F 21/42 705/405 |
| 8,613,055 | B1 | 12/2013 | Tomilson et al. | |
| 8,719,582 | B2* | 5/2014 | Neystadt | G06F 21/10 705/65 |
| 8,769,289 | B1* | 7/2014 | Kronrod | G06F 21/43 380/285 |
| 2006/0174121 | A1* | 8/2006 | Omae | H04L 63/0823 713/172 |
| 2008/0244721 | A1* | 10/2008 | Barrus | G06F 21/6254 726/9 |
| 2011/0231912 | A1 | 9/2011 | Lee et al. | |
| 2013/0318359 | A1* | 11/2013 | Morris | G06F 21/62 713/185 |

OTHER PUBLICATIONS

Attribute-Based Access to Scalable Media in Cloud-Assisted Content Sharing Networks, Wu et al, IEEE Transactions on Multimedia, vol. 15, Issue: 4, Jun. 2013.*

(Continued)

Primary Examiner — Jahangir Kabir
(74) Attorney, Agent, or Firm — BainwoodHuang

(57) ABSTRACT

An access token is synchronized across multiple trusted devices when one of the trusted devices obtains an authorization grant from a resource owner, and uses the authorization grant to obtain the access token. The access token is synchronized with other trusted devices indicated in a trusted device list, by securely transmitting the access token to each of the trusted devices indicated in the trusted device list other than the first device. A second trusted device may then access the protected resource, using the access token originally obtained by the first device, without having to request the authorization grant from the resource owner to obtain a new access token.

10 Claims, 5 Drawing Sheets

(56) References Cited

OTHER PUBLICATIONS

Digital safe: Secure synchronization of shared files, Jemel et al, Information Assurance and Security (IAS), 2015 11th International Conference, IEEE 2015.*
B. Kaliski; "PKCS #5: Password-Based Cryptography Specification"; Version 2.0; Sep. 2000; downloaded on Jul. 24, 2015 from https://www.ietf.org/rfc/rfc2898; 32 pages.
J. Schaad; "advanced encryption standard (AES) Key Wrap Algorithm"; Sep. 2002; downloaded on Jul. 24, 2015 from https://tools.ietf.org/rfc/rfc3394; 39 pages.
Adi Shamir; "How to Share a Secret"; Communications of the ACM; vol. 22; No. 11; Nov. 1979; 2 pages.
D. Hardt; "The Oauth 2.0 Authorization Framework"; Standards Track; Oct. 2012; 76 pages.
H. Krawczyk, et al.; "HMAC: Keyed-Hashing for Message Authentication"; Feb. 1997; 10 pages.
AES Key Wrap Specification; Nov. 2001; 23 pages.

* cited by examiner

TRUSTED DEVICE LIST 300

| DEVICE IDENTIFIER | PUBLIC KEY/CERTIFICATE | ACCESS SYNCH POLICIES |
|---|---|---|
| Device-1-ID | Device-1-PubKey-Cert | Device-1-Synch-Policies |
| Device-2-ID | Device-2-PubKey-Cert | Device-2-Synch-Policies |
| Device-3-ID | Device-3-PubKey-Cert | Device-3-Synch-Policies |
| | | |
| | | |
| | | |

302 → (Device Identifier)
304 → (Public Key/Certificate)
306 → (Access Synch Policies)
ENTRIES 308

Fig. 3

SYNCHRONIZATION OF ACCESS TOKENS FOR SESSION CONTINUITY ACROSS MULTIPLE DEVICES

BACKGROUND

In the OAuth 2.0 Authorization Framework described in Request for Comments (RFC) 6749 ("OAuth 2.0"), a client requests access to resources that are controlled by a resource owner and hosted by a resource server, and is issued a different set of credentials to access the protected resources than those of the resource owner. Specifically, the client obtains an authorization grant from the resource owner, authenticates with an authorization server, and presents the authorization grant to the authorization server. The authorization server authenticates the client, validates the authorization grant, and issues an access token to the client. The client then requests the protected resource from the resource server and authenticates by presenting the access token. The resource server checks the access token, and grants the client access to the protected resource in response to a valid access token from the client.

SUMMARY

Previous approaches to granting access to protected resources based on access tokens have exhibited significant shortcomings. For example, every time the user moves from one device to another when accessing a protected resource, the user has been required to present an authorization grant to the client, and the client on the new device has been required to authenticate to the authorization server, even when a previously issued access token is still valid for the resource. In this way, access tokens have not been portable across devices.

To address such shortcomings of previous solutions, techniques are disclosed for synchronizing an access token across multiple devices. Using the disclosed techniques, a trusted device list is generated that stores indications of devices trusted by a resource owner, such as an end user. A first one of the resource owner's trusted devices obtains an authorization grant from the resource owner, and uses the authorization grant to obtain an access token containing credentials for accessing a protected resource.

The access token is then synchronized with the other devices indicated in the trusted device list, by securely transmitting the access token to each of the other trusted devices indicated in the trusted device list. A second trusted device may then access the protected resource, using the access token obtained by the first device, without having to obtain the authorization grant from the resource owner and re-authenticate to the authorization server.

In another aspect of the disclosed techniques, the access token may be securely transmitted to each of the trusted devices indicated by the trusted device list other than the first device by encrypting the access token using a random data encryption key to generate an encrypted version of the access token, and, for each of the devices indicated in the trusted device list other than the first device, generating an encrypted version of the random encryption key by encrypting the random encryption key with a public key of that device. The encrypted version of the access token may then be synchronized with each other device indicated in the trusted device list by transmitting an enveloped data package containing the encrypted version of the access token together with the encrypted version of the random encryption key generated with the public key of that device.

In an alternative embodiment, enveloped data packages are created for each one of the other devices indicated in the trusted device list, containing the encrypted version of the access token together with the encrypted version of the random encryption key generated using the public key of that device, and transmitted to a remote server. The server then transmits notification messages to the other devices indicated in the trusted device list, indicating that each device other than the first device is to retrieve the access token from the server. The server receives requests for the access token from each one of the devices indicated in the trusted device list other than the first device, and returns one of the enveloped data packages in response to each request received for the access token, by transmitting, to the requesting device, the enveloped data package with the encrypted version of the random key generated using public key of that device.

In another aspect of the disclosed techniques, the remote server may detect, in response to receipt of a request for the access token from one of the devices indicated in the trusted device list, that the requested access token has expired. In that case, the remote server may return an error code to the requesting device indicating that the request access token has expired.

In another aspect of the disclosed techniques, generating the trusted device list for the resource owner may include adding a device to the trusted device list. For example, a request to access the protected resource may be received from a new device that is not indicated in the trusted device list. The request may include a representation of passphrase data input to the new device, such as a master passphrase of the resource owner. In response to the receiving the request to access the protected resource from the new device, the disclosed system may transmit a confirmation request message to each of the devices indicated in the trusted device list. The confirmation request message requests confirmation that the new device is trusted by the resource owner, and may be added to the trusted device list. In response to receipt of the request for confirmation, each device on the trusted device list may generate a user interface prompt and/or otherwise allow the resource owner to input the master passphrase. One of the devices on the trusted device list may then receive the master passphrase data entered through its user interface. The passphrase data input to the new device and the passphrase data input to the device indicated in the trusted device list is compared, and the new device is only added to the trusted device list in response to the passphrase data input to the new device matching the passphrase data input to the device indicated in the trusted device list. In one embodiment, the comparison of passphrase data from the new device with passphrase data from the device on the trusted device list is based on a comparison of message access codes (MACs) generated based on the passphrases input by the respective devices.

The protected resource may, for example, be a secure application or service, and obtaining the access token by the first device may be part of establishing an authenticated session with the secure application for the resource owner. In such a case, accessing the protected resource by the second device may include i) detecting that the resource owner is requesting a connection from the second device to the secure application, ii) locating the access token obtained using the first device in the second device in response to the resource owner requesting the connection with the secure application from the second device, and iii) using the copy of the access token obtained by the first device to access the secure application from the second device without requiring the resource owner to enter an authorization grant (e.g. username and password) on the second device. Depending on the specific architecture of the resource server for the application and its state machine, the user's workflow process can then be resumed from the second device. For example, a resource owner may make product selections on a merchant Web site using the first device, and then save the product selections into a shopping cart. The resource owner can then move to the second device and provide payment information to the site for the items saved to the shopping cart, and complete the order from the second device.

Embodiments of the disclosed techniques may be used to synchronize either access tokens and/or refresh tokens used to obtain new access tokens when they expire. Synchronization of access tokens and/or refresh token between trusted devices may be accomplished securely using peer-to-peer and/or client-server communication protocols. In either case, only clients on trusted devices are able to access the access tokens and/or refresh tokens. The disclosed techniques may also or alternatively be embodied such that synchronization of access tokens across trusted devices may be performed by the client, and/or by a specialized access token agent that acts as a keeper for the access token. In a single-sign on (SSO), federated application environment, the disclosed system not only supports SSO to all federated applications, but also from any user trusted device.

Embodiments based on the disclosed techniques may provide significant advantages over previous technologies. Embodiments may, for example, allow an access token to be synchronized and shared with a multiplicity of a resource owner's trusted devices, enabling access to a protected resource in near real-time from multiple trusted devices without having to request a new authorization grant from the user.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is a block diagram showing an example of a trusted device list used in one embodiment to synchronize an access token and/or refresh token across multiple trusted devices;

DETAILED DESCRIPTION

Embodiments of the invention will now be described. It is understood that such embodiments are provided by way of example to illustrate various features and principles of the invention, and that the invention hereof is broader than the specific examples of embodiments disclosed herein.

Figure 1:
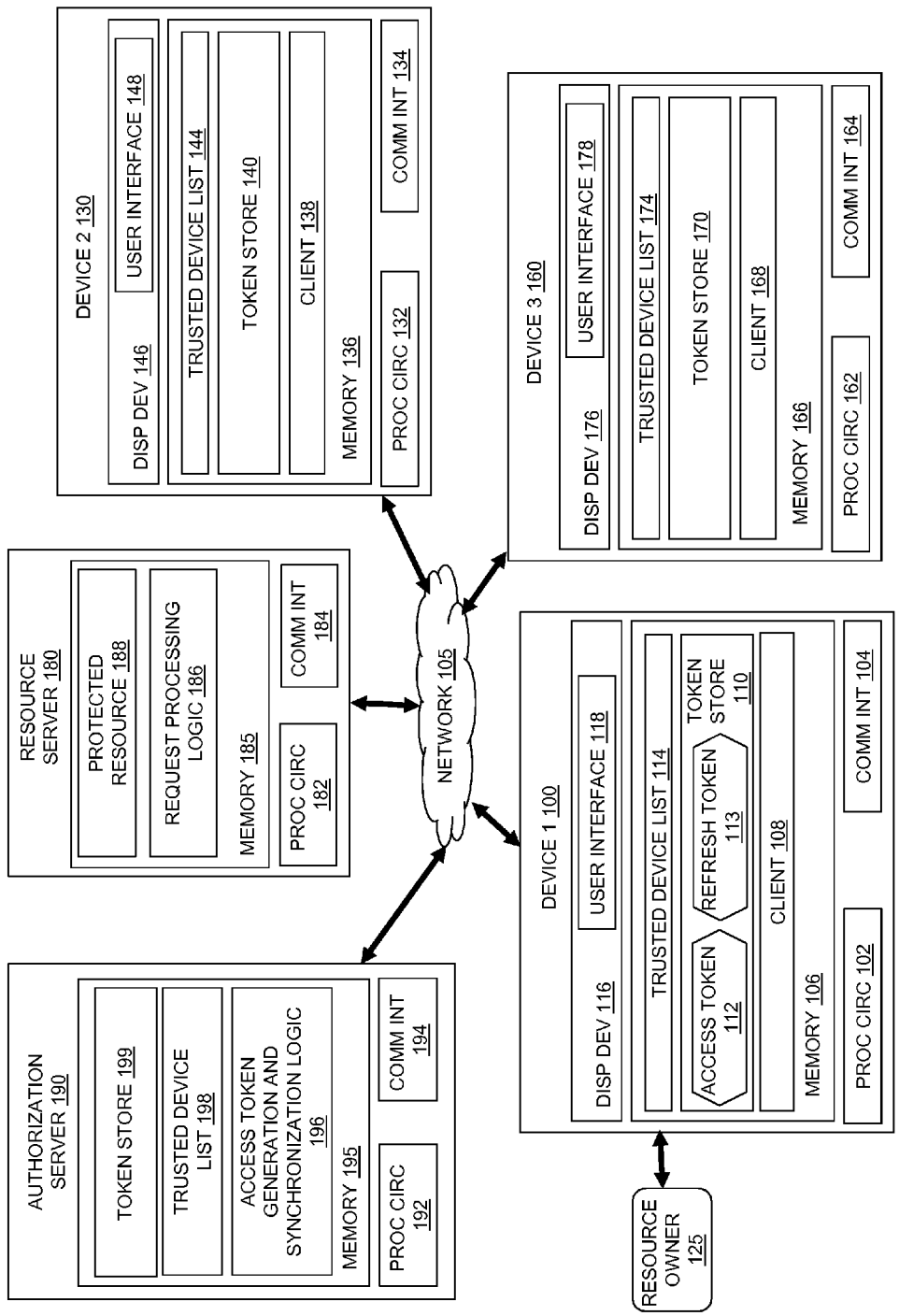
FIG. 1 is a block diagram showing components in an illustrative embodiment when operating to acquire an access token and a refresh token in a first device that is trusted by a resource owner.

In the example of FIG. 1, a Device 1 100, Device 2 130, Device 3 160, Authorization Server 190, and Resource Server 180 are communicably interconnected through a Network 105. The Network 105 may, for example, include one or more communication networks of any specific type, such as the Internet, a WAN (Wide Area Network), a LAN (Local Area Network), or any other type of communication network.

Each of Device 1 100, Device 2 130, Device 3 160, Authorization Server 190, and Resource Server 180 include processing circuitry, communication interfaces, and memory. Specifically, Device 1 100 includes Processing Circuitry 102, Communication Interfaces 104, and Memory 106; Device 2 130 includes Processing Circuitry 132, Communication Interfaces 134, and Memory 136; Device 3 160 includes Processing Circuitry 162, Communication Interfaces 164, and Memory 166; Authorization Server includes Processing Circuitry 192, Communication Interfaces 194, and Memory 195; and Resource Server 180 includes Processing Circuitry 182, Communication Interfaces 184, and Memory 185.

The communication interfaces in each of Device 1 100, Device 2 130, Device 3 160, Authorization Server 190, and Resource Server 180 may, for example, include one or more adapters and/or network interface adapters for converting electronic and/or optical signals received over a Network 105 into electronic form for use by the respective device or server.

The processing circuitry in each of Device 1 100, Device 2 130, Device 3 160, Authorization Server 190, and Resource Server 180 may for example, include or consist of one or more microprocessors, e.g. central processing units (CPUs), multi-core processors, chips, and/or assemblies.

The memory in each of Device 1 100, Device 2 130, Device 3 160, Authorization Server 190, and Resource Server 180 may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on the respective processing circuitry, and for storing data operated on by such program code. For example, program code executable on Device 1 100 is shown including Client 108, program code executable on Device 2 130 is shown including Client 138, program code executable on Device 3 160 is shown including Client 168, program code executable on Authorization Server 190 is shown including Access Token Generation and Synchronization Logic 192, and program code executable on Resource Server is shown including Request Processing Logic 186. The Protected Resource 188 in Resource Server 180 may include or consist of protected data and/or a protected application or service that may also include program code executable at least in part on Resource Server 180.

Each of Authorization Server 190, Device 1 100, Device 2 130, and Device 3 160 may further include a token store that may be used to store one or more access tokens. For example, Authorization Server 190 may include Token Store 199, Device 1 100 may include Token Store 110, Device 2 130 may include Token Store 140, and Device 3 160 may include Token Store 170. Each of Authorization Server 190, Device 1 100, Device 2 130, and Device 3 160 may further include a trusted device list used to store data describing and/or related to one or more devices that are trusted by an associated resource owner. For example, Authorization Server 190 may include Trusted Device List 198, Device 1 100 may include Trusted Device List 114, Device 2 130 may include Trusted Device List 144, and Device 3 160 may include Trusted Device List 174. In one embodiment, the Trusted Device List 198 is pushed out to each of the trusted devices indicated by Trusted Device List 198 (e.g. Device 1 100, Device 2 130, and Device 3 160), whenever there is a change to the list, such as a device being added to the list or a device being removed from the list.

Each of Device 1 100, Device 2 130 and Device 3 160 may further include a display device (e.g. liquid crystal display, etc.) operable to display a graphical user interface through which a user (e.g. Resource Owner 125) may enter (e.g. type or select using an input device such as a keyboard, and/or a computer mouse or other pointing device) a username, password, and/or passphrase or other data through one or more forms or other user interface constructs. For example, Device 1 100 includes Display Device 116 operable to display User Interface 118, Device 2 130 includes Display Device 146 operable to display User Interface 148, and Device 3 160 includes Display Device 176 operable to display User Interface 178.

For each of Device 1 100, Device 2 130, Device 3 160, Authorization Server 190, and Resource Server 180, the processing units and the memory together form control circuitry, which is constructed and arranged to carry out various methods and functions as described herein. Each memory includes a variety of software constructs realized in the form of executable instructions. When the executable instructions are executed by the processing units, the processing units are caused to carry out the operations of the software constructs. Although certain software constructs are specifically shown and described, it is understood that the memory may include other software constructs, which are not shown, such as an operating system and various applications, and/or other processes or daemons.

It will be evident that Device 1 100, Device 2, 130 and/or Device 3160 may be embodied using any specific type of computerized user device, including but not limited to desktop computers, and/or mobile devices such as laptop computers, tablet computers, smartphones, personal digital assistants (PDAs), and/or other types of user devices. It will also be evident that Authorization Server 190 and/or Resource Server 180 may be embodied using any specific type of server computer systems.

During operation of the embodiment shown in FIG. 1, a trusted device list is generated that stores indications of devices trusted by Resource Owner 125. Resource Owner 125 may, for example, be an end user. A first one of Resource Owner 125's trusted devices, Device 1 100, obtains an authorization grant from Resource Owner 125. The authorization grant is a credential representing the Resource Owner 125's authorization to access Protected Resource 188. One example of the authorization grant is password credentials, such as a username and password, obtained from Resource Owner 125 through User Interface 118.

Device 1 100 uses the authorization grant to obtain Access Token 112 from Authorization Server 190. For example, Client 108 authenticates to Authorization Server 190, and presents the authorization grant to Access Token Generation and Synchronization Logic 196. Access Token Generation and Synchronization Logic 196 validates the authorization grant and issues Access Token 112 to Client 108. Access Token 112 represents an authorization issued to Client 108, and contains credentials, which are different from the authorization grant obtained from Resource Owner 125. The credentials in Access Token 112 allow access to the Protected Resources 188. For example, in one embodiment, Access Token 112 may be a string denoting a specific scope of access permitted with regard to Protected Resource 188, a time duration (or "lifetime") for which the access token is valid, and/or other access attributes.

Access Token Generation and Synchronization Logic 196 may also issue Refresh Token 113 to Client 108 upon validating the authorization grant. Refresh Token 113 contains credentials that may be used to obtain a new access token from Authorization Server 190 when Access Token 112 becomes invalid or expires. Unlike Access Token 112, Refresh Token 113 is used only with Authorization Server 190, and is not sent to Resource Server 180.

Client 108 stores both Access Token 112 and Refresh Token 113 into Token Store 110.

Client 108 then authenticates to Resource Server 180 by presenting Access Token 112 to Request Processing Logic 186. Request Processing Logic 186 validates Access Token 112, and, in response to finding that Access Token 112 is valid, grants Client 108 access to Protected Resource 188.

Access Token 112 and/or Refresh Token 113 is then synchronized with the other devices indicated in the trusted device list, by securely transmitting Access Token 112 and/or Refresh Token 113 to each of the other trusted devices indicated in the trusted device list. For example, if each of Device 2 130 and Device 3 160 are on the trusted device list, Access Token 112 and/or Refresh Token 113 is transmitted to both of Device 2 130 and Device 3 160. After the Access Token 112 is synchronized with Device 2 130 and Device 3 160, Client 138 on Device 2 130 and/or Client 168 on Device 3 160 may then access Protected Resource 188, using the Access Token 112 obtained by the Device 1 100, without having to re-authenticate their clients and/or request the authorization grant from Resource Owner 125 in order to obtain a new access token. In an embodiment in which only Refresh Token 113 is synchronized across the other devices in the trusted device list (e.g. Device 2 130 and Device 3 160), Client 138 and/or Client 168 may use Refresh Token 113 to obtain a new access token, that is then used to access Protected Resource 188, also without having to request the authorization grant from Resource Owner 125 in order to obtain the new access token.

In one embodiment, Access Token 112 and/or Refresh Token 113 may be securely transmitted to the other devices on the trusted device using direct communications between Device 1 100 and the other devices indicated by the trusted device list, in a peer-to-peer type of distribution. For example, in one embodiment, Access Token 112 and/or Refresh Token 113 may be securely transmitted to the other trusted devices indicated by the trusted device list (e.g. Device 2 130 and Device 3 160) by Client 1 108 first encrypting Access Token 112 and/or Refresh Token 113 using a randomly generated data encryption key ("DEK"), prior to transmission. In addition, for each of the other trusted devices, Client 1 108 generates an encrypted version of DEK by encrypting DEK with a public key of that device. The public key of each one of the trusted devices is part of a key pair generated by or for the device, that also includes the device's private key, which is required to decrypt data encrypted by the device's public key, and must be securely maintained by the device.

The encrypted version of Access Token 112 and/or Refresh Token 113 may then be synchronized by transmitting an enveloped data package directly to each one of the other trusted devices containing a copy of the encrypted version of Access Token 112 and/or Refresh Token 113, together with the encrypted version of DEK generated using the public key of that device.

Alternatively, Access Token 112 and/or Refresh Token 113 may be securely transmitted to the other devices on the trusted device using a client-server approach by passing Access Token 112 and/or Refresh Token 113 from Device 1 100 to the other devices on the trusted device list through Authorization Server 190. For example, the encrypted version of the Access Token 112 and/or Refresh Token 113 may be transmitted to the other trusted devices with the encrypted versions of DEK by Device 1 100 transmitting an enveloped data package for each one of the other devices indicated in the trusted device list to Authorization Server 190. The enveloped data package transmitted to Authorization Server 190 for each one of the other devices indicated on the trusted device list contains the encrypted version of Access Token 112 and/or Refresh Token 113 together with the encrypted version of DEK generated using the public key of that device. After it receives the enveloped data packages from Device 1 100, Authorization Server 190 transmits a notification to the other devices indicated in the trusted device list (e.g. Device 2 130 and Device 3 16), indicating that each device is to retrieve Access Token 112 and/or Refresh Token 113 from Authorization Server 190. Authorization Server 190 then receives requests for Access Token 112 and/or Refresh Token 113 from each device indicated in the trusted device list other than the first device (e.g. from Device 2 130 and Device 3 160), and returns the one of the enveloped data packages corresponding to the requesting device. For example, Authorization Server 190 responds to a request for Access Token 112 and/or Refresh Token 113 received from Device 2 130 by transmitting, to Device 2 130, the enveloped data package containing i) the encrypted version of DEK generated using the public key of Device 2 130, and ii) the encrypted version of Access Token 112 and/or Refresh Token 113 created using DEK. Similarly, Authorization Server 190 responds to a request for Access Token 112 and/or Refresh Token 113 received from Device 3 160 by transmitting, to Device 2 130, the enveloped data package containing i) the encrypted version of DEK generated using the public key of Device 3 160, and ii) the encrypted version of Access Token 112 and/or Refresh Token 113 created using DEK.

In one embodiment, Authorization Server 190 may detect, in response to receipt of a request for Access Token 112 from either Device 2 160 and/or Device 3 160, that Access Token 112 has expired. In that case, Authorization Server 190 may return an error code to the device from which the request was received, indicating that the requested access token has expired.

Generating a trusted device list for the Resource Owner 125 may include adding new devices to the trusted device list that were not previously listed in the trusted device list. For example, in one embodiment, Authorization Server 190 may receive a request from Device 3 160 for an access token to use to access Protected Resource 188 on behalf of Resource Owner 125 prior to Device 3 160 being listed in the trusted device list. When processing the request, Authorization Server 190 also determines whether Device 3 160 should be added to the trusted device list for Resource Owner 125. For example, Authorization Server 190 may transmit a confirmation request message to each of the devices previously added to the trusted device list, requesting confirmation that Device 3 160 should be added to the trusted device list. Prior to Device 3 160 being added to the trusted device list, Device 1 100 and Device 2 130 may have previously been added to the trusted device list, and in that case Authorization Server 190 would transmit the confirmation request message to each of Device 1 100 and Device 2 130. In response to receipt of the confirmation request message from Authorization Server 190, each of Device 1 100 and/or Device 2 130 generate a prompt or other type of user interface object that allows Resource Owner 125 to input a master passphrase. For example, Client 108 in Device 1 100 may generate a form or other display object in User Interface 118 that allows Resource Owner 125 to enter his or her master passphrase into Device 1 100, and/or Client 138 in Device 2 130 may generate a form or other display object in User Interface 148 that allows Resource Owner 125 to enter his or her master passphrase in to Device 2 130. When one of the devices on the trusted device list receives passphrase data through their respective user interface, the passphrase data received on the trusted device is then compared to passphrase data provided from the new device that requested an access token to access Protected Resource 188. The comparison of the passphrase data may be performed on Authorization Server 190, or on the trusted device that received passphrase data through its user interface. For example, in one embodiment, the request received by Authorization Server 190 includes passphrase data entered through User Interface 178 on Device 3 160. In response to receiving passphrase data through User Interface 118 on Device 1 100, Device 1 100 transmits it's received passphrase data to Authorization Server 190 for comparison by Authorization Server 190 to the passphrase data received from Device 3 160. In an alternative embodiment, Authorization Server 190 may transmit the passphrase data received from Device 3 160 to Device 1 100, and the comparison of the passphrase data may be performed on Device 1 100. In either embodiment, a message authentication code (MAC) generated at Device 3 160 and derived from the passphrase data received at Device 3 160 may be conveyed to Authorization Server 190 and/or Device 1 100 for comparison to a MAC generated by Device 1 100 and derived from the passphrase data received at Device 1 100. The passphrase data received from Device 3 160 may be determined to match the passphrase data received by Device 1 100 if the MAC generated at Device 3 160 matches the MAC generated at Device 1 100.

The new device, in this example Device 3 160, is only added to the trusted device list if the passphrase data from the new device matches the passphrase data received at the device already on the trusted device list, e.g. Device 1 100.

Figure 2:
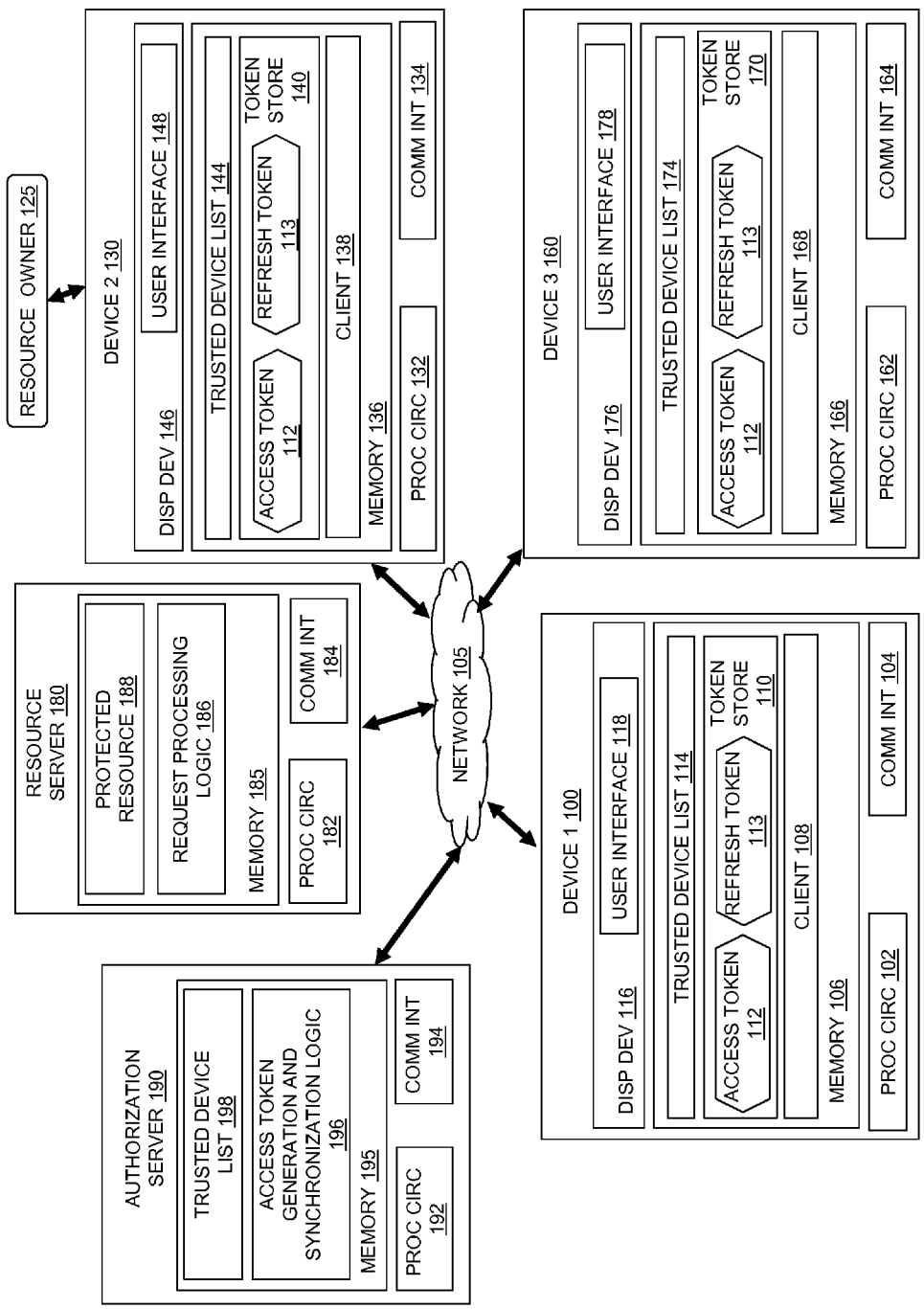
FIG. 2 is a block diagram showing the components in the illustrative embodiment of FIG. 1, following synchronization of the access token and refresh token originally acquired by the first trusted device across a number of other devices that are also trusted by the resource owner.

FIG. 2 is a block diagram showing the components in the illustrative embodiment of FIG. 1, following a synchronization of Access Token 112 and Refresh Token 113 from Device 1 100 to Device 2 130 and Device 3 160. As shown in FIG. 2, following synchronization of Access Token 112 and Refresh Token 113 to Device 2 130 and Device 3 160, copies of Access Token 112 and Refresh Token 113 are stored in Token Store 140 of Device 2 130 and Token Store 170 of Device 3 160. The copy of Access Token 112 in Token Store 140 allows Resource Owner 125 to access Protected Resource 188 through Device 2 130 without having to provide an authorization grant (e.g. username and password) to Client Logic 138 and obtain a new access token. Instead, Client 138 presents the copy of Access Token 112 from Token Store 140 to Request Processing Logic 186 in order to immediately obtain access to Protected Resource 188 for Resource Owner 125 on Device 2 130.

For example, the Protected Resource 188 may be a secure application or service, and obtaining the Access Token 112 and Refresh Token 113 by Device 1 100 may be part of establishing an authenticated application session for Resource Owner 125. In such a case, accessing the Protected Resource 180 using a second trusted device, such as Device 2 130, after synchronization of Access Token 112 and Refresh Token 113 with Device 2 130 includes i) detecting that Resource Owner 125 is requesting a connection from Device 2 130 to the secure application, ii) locating a copy of the Access Token 112 stored in Device 2 130 in response to Resource Owner 125 requesting the connection with the secure application from Device 2 130, and iii) using the copy of Access Token 112 stored in Device 2 130 to access the secure application from Device 2 130 without requiring Resource Owner 125 to re-enter the authorization grant (e.g. username and password) and obtain a new access token from the Authorization Server 190.

While FIG. 2 shows both Access Token 112 and Refresh Token 113 having been synchronized from Device 1 100 to the other devices in the trusted device list (e.g. Device 2 130 and Device 3 160), in an alternative embodiment only Refresh Token 113 is synchronized from Device 1 100 to the other devices on the trusted device list. In such an alternative embodiment, only copies of Refresh Token 113 would be stored in Token Store 140 and Token Store 170. For example, when Resource Owner 125 initiates an access to Protected Resource 188 from Device 2 130, Client 138 locates a copy of Refresh Token 113 stored in Token Store 140, uses Refresh Token 113 to obtain a new access token from Authorization Server 190, and then presents the new access token obtained from Authorization Server 190 to Request Processing Logic 186 to obtain access to Protected Resource 188 on Device 2 130 without having to obtain an authorization grant (e.g. username and password) from Resource Owner 125 on Device 2 130.

FIG. 3 is a block diagram showing an example of a Trusted Device List 300 used in one embodiment to synchronize access tokens across multiple trusted devices of a resource owner. Trusted Device List 300 includes a number of Entries 308, each of which represents one of the trusted devices in the list. A first column 302 stores the device identifier for the corresponding trusted device, such as a device name or address that may be used to identify and/or communicate with the device. A second column 304 stores a public key or public key certificate for the corresponding trusted device. The public key in column 304 is part of a key pair that also includes a private key securely maintained by the corresponding trusted device, and that enables secure communication to the trusted device based on public key cryptography. A third column 306 stores access token synchronization policy information that may optionally be applied when synchronizing access tokens to the corresponding trusted device. For example, the contents of column 306 may indicate whether the corresponding trusted device is managed by a specific business enterprise, e.g. the business enterprise that employs the resource owner. Based on such access token synchronization policy information, the disclosed system may be embodied to limit the specific access tokens that are synchronized to specific trusted devices. For example, access token synchronization may be completely prohibited with regard to trusted devices that are not managed by a specific business enterprise. In another example, synchronization of certain access tokens, such as access tokens that enable access to certain specific protected resources that are owned by or under the control of a specific business enterprise, can be prevented from being synchronized to trusted devices that are not managed by the same business enterprise.

Figure 4:
FIG. 4 is a flow chart showing an example of steps performed in an illustrative embodiment to synchronize an access token and/or refresh token acquired by a first device across multiple other trusted devices.

FIG. 4 is a flow chart showing an example of steps performed in an illustrative embodiment to synchronize an access token acquired by a first device across multiple other trusted devices. At step 400, a client (e.g. Client 108 in FIG. 1) on a first device (e.g. Device 1 100 in FIG. 1), obtains an access token and/or refresh token (e.g. Access Token 112 and/or Refresh Token 113 in FIG. 1) from an authorization server (e.g. Authorization Server 190 in FIG. 1). At step 402, the client on the first device determines whether there are any other devices on the trusted device list. If there are any other devices on the trusted device list, the client on the first device retrieves the public key certificates of those devices, e.g. from a copy of the trusted device list stored on the first device.

At step 404, the client on the first device randomly generates a symmetric data encryption key ("DEK"). At step 406, the client on the first device encrypts the access token and/or refresh token using DEK. For example, the client on the first device may encrypt the access token and/or refresh token using the DEK using a key wrap algorithm or the like, for example a key wrap algorithm as described in the AES Key Wrap Specification.

At step 408, the client on the first device encrypts the DEK using the public keys of the other devices on the trusted device list. In other words, at step 408, the client creates an encrypted version of the DEK for each one of the other devices on the trusted device list by using the public key of that device to encrypt the DEK.

At step 410, the client on the first device creates an enveloped data package for each one of the other devices on the trusted device list. The enveloped data package for each one of the other devices on the list contains a copy of the encrypted access token and/or refresh token, and the encrypted version of the DEK created by encrypting the DEK using the public key of that device.

At step 412, the client on the first device transmits the enveloped data packages generated at step 410 to a remote server system (e.g. Authorization Server 190 in FIG. 1). Following receipt of the enveloped data packages, at step 414 the server notifies all the devices on the trusted device list, or all the devices on the trusted device list other than the first device, that the access token and/or refresh token obtained by the client on the first device is available for synchronization to the other trusted devices. The notification provided by the server at step 414 may, for example, be provided by transmitting a message from the remote server to each trusted device, e.g. over the Network 105 shown in FIG. 1.

At step 416, in response to the notifications at step 414, the clients on each of the other trusted devices indicated in the trusted device list (e.g. Client 136 and Client 168 in FIG. 1) connect to the server (e.g. over Network 105) and request a copy of the access token and/or refresh token obtained by the first device at step 400.

At step 418, in response to each of the requests received at step 416, the server returns (e.g. over Network 105) one of the enveloped data packages to the requesting device. The enveloped data package returned to a given requesting device includes a copy of the encrypted version of the access token and/or refresh token, and the encrypted version of the DEK created by encrypting the DEK using the public key of the requesting device.

At step 420, each of the requesting devices receives the enveloped data package transmitted from the server, and stores it in a local store (e.g. Token Store 140 and Token Store 170 in FIG. 1). Each of the requesting devices may then access the encrypted version of the DEK in their respective enveloped data package using their private key, and then use the decrypted DEK to decrypt the access token and/or refresh token also contained in the enveloped data package.

While the above description with regard to FIG. 4 involves a client-server approach to synchronizing the access token and/or refresh token from the first device to the other device on the trusted device list, in an alternative embodiment a peer-to-peer approach may be employed. In such an alternative embodiment, the enveloped data packages created at step 410 may be transmitted directly from the first device to the other devices on the trusted device list.

Figure 5:
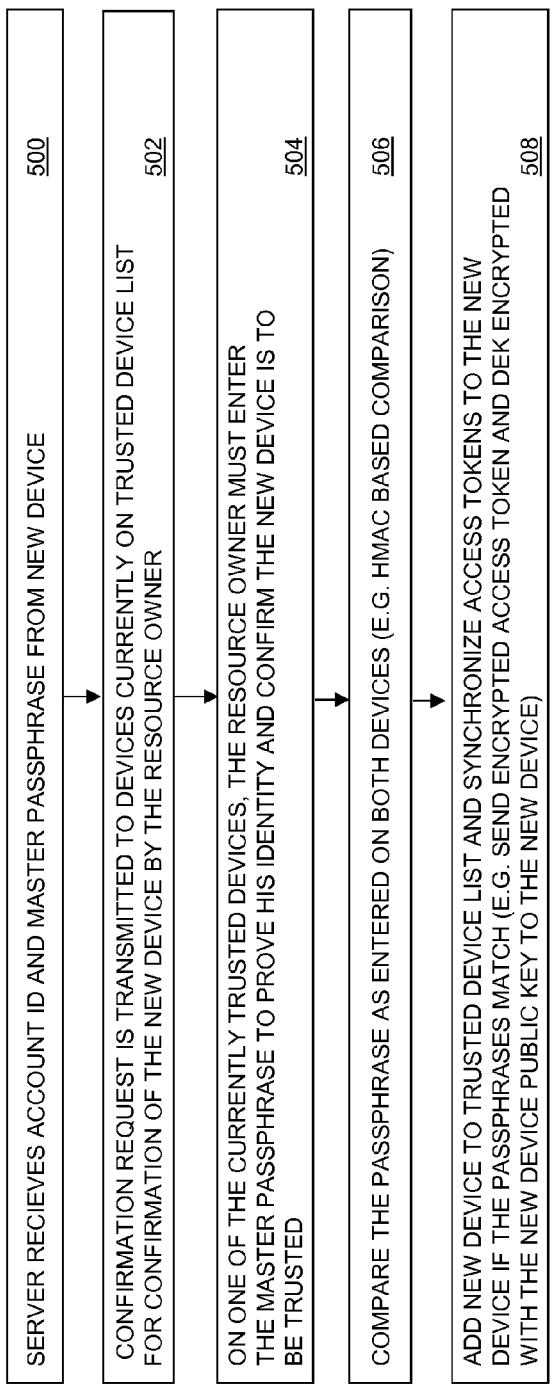
FIG. 5 is a flow chart showing steps performed in an illustrative embodiment to establish a device as a trusted device for purposes of access token synchronization.

FIG. 5 is a flow chart showing steps performed in an illustrative embodiment to establish a device as a trusted device for purposes of access token synchronization. At step 500, an account identifier and master passphrase data are received from a device that has not yet been added to the trusted device list (a "new" device). For example, an account identifier indicating the resource owner's account on a secure remote application (e.g. an electronic mail address or other identifier of the resource owner), together with master passphrase data, may be received from the new device by the authorization server. Upon receipt of the request to access the secure remote application, the authorization server determines that the new device is not indicated in the list of trusted devices for the resource owner. As a result of determining that the new device is not listed in the list of trusted devices for the resource owner, at step 502 the authorization server transmits a confirmation request message to one or more devices already listed on the trusted device list, requesting confirmation of the new device as a trusted device by the resource owner. The confirmation request causes one or more of the devices already listed on the trusted device list to generate a prompt in their user interface requesting that the resource owner enter the master passphrase into one of the devices already listed on the trusted device list, in order to confirm that the new device is to be added to the trusted device list. The prompt generated requesting the master passphrase may also include an indication of the new device, such as a name and/or type or model of the new device. If the resource owner wishes to confirm that the new device is to be trusted and accordingly added to the trusted device list, at step 504 the resource owner enters master passphrase data into one of the devices already listed on the trusted device list (the "existing" device).

At step 506, the master passphrase data received from the new device is compared with the master passphrase data input to the existing device. The comparison may be performed either at the existing device, or at the server. In the case where the comparison is made at the existing device, the passphrase data from the new device may be forwarded from the server to the existing device with the confirmation request transmitted at step 502. At step 508, the new device is only added to the trusted device list if the master passphrase data received from the new device matches the master passphrase data input to the existing device. If the new device is added to the trusted device list, the access token and/or refresh token encrypted with the DEK, and the DEK encrypted with the public key of the new device, are transmitted to the new device, either through the remote server using a client-server model, or directly from the existing device using a peer-to-peer model.

In one embodiment, a message access code (MAC) is generated for the new device based on passphrase data input to the new device and a public key of the new device. The MAC for the new device may, for example, be generated based on Keyed-Hashing for Message Authentication (HMAC), as described in Request for Comments (RFC) 2104. The MAC for the new device and the public key of the new device may be transmitted to the existing device with the confirmation request message(s) at step 502. Upon receiving the confirmation request message, and in response to subsequently receiving master passphrase data through its user interface as a confirmation that the new device is to be added to the trusted device list, the existing device generates a MAC for the existing device using HMAC, where the MAC for the existing device is based on the master passphrase data received through the user interface of the existing device and the public key of the new device. If the MAC for the new device matches the MAC for the existing device, then the master passphrase data received from the new device matches the master passphrase data received through the user interface of the existing device, and the new device is added to the trusted device list.

While the above description makes reference to access tokens, entities and protocols described in OAuth 2.0, the disclosed system is not so limited. The disclosed system may alternatively be embodied in or using other authorization frameworks such as Security Assertion Markup Language (SAML), and authentication protocols such as Kerberos when authentication and authorization are delegated to a local agent on device. In such an embodiment, the agent is responsible for i) obtaining the SAML assertion or the Kerberos token after authenticating the end-user, ii) saving and synchronizing the assertion or the token across all other trusted devices, and returning the SAML assertion or Kerberos token to the requesting Service Provider/Relying Party application in order to access the protected resource. When the end-user switches to another trusted device, and attempts to access the same protected resource through the Service Provider/Relying Party application, the agent on the new device will have the SAML assertion or the Kerberos token available for reuse, without having to re-authenticate the user against the Identity provider.

Those skilled in the art will recognize that the disclosed techniques are significantly more than the abstract idea of accessing a resource, and that embodiments based on the disclosed techniques address technical problems arising from the approaches used in previous technologies. Embodiments of the disclosed techniques may, for example, advantageously allow an access token to be synchronized and shared with a multiplicity of a resource owner's trusted devices, enabling access to a protected resource in near real-time from multiple trusted devices without having to request a new authorization grant from the user.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(es) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of synchronizing an access token across multiple devices, the method comprising the steps of:
generating a trusted device list for a resource owner, the trusted device list storing indications of devices trusted by the resource owner, the trusted device list indicating at least a first device trusted by the resource owner and a second device trusted by the resource owner, wherein generating the trusted device list for the resource owner includes adding a device to the trusted device list by i) receiving a request from a new device, the new device not indicated in the trusted device list, wherein the request includes passphrase data from the new device, ii) in response to the request from the new device, transmitting a confirmation request to each of the devices indicated in the trusted device list, the confirmation request causing one of the devices indicated in the trusted device list to input passphrase data, iii) comparing the passphrase data received from the new device to the passphrase data input to one of the devices indicated in the trusted device list, and iv) adding the new device to the trusted device list in response to the passphrase data received from the new device matching the passphrase data input to one of the devices indicated in the trusted device list;
inputting, by the first device trusted by the resource owner, an authorization grant from the resource owner;
obtaining, by the first device using the authorization grant, an access token for a protected resource, wherein the access token includes credentials for accessing the protected resource;
synchronizing the access token with the devices indicated in the trusted device list other than the first device by securely transmitting a copy of the access token to each of the trusted devices indicated in the trusted device list other than the first device, wherein securely transmitting a copy of the access token to each of the trusted devices indicated in the trusted device list other than the first device includes i) generating an encrypted version of the access token by encrypting the access token using a random data encryption key, ii) generating an encrypted version of the random data encryption key for each one of the devices indicated in the trusted device list other than the first device by encrypting the random data encryption key with a public key associated with the device, iii) creating an enveloped data package for each of the devices indicated in the trusted device list other than the first device, the package for each device containing the copy of the encrypted version of the access token and the encrypted version of the random data encryption key, iv) transmitting the enveloped data packages to a remote server, v) transmitting a notification to each device indicated in the trusted device list other than the first device, the notification indicating to the device that the device is to retrieve the enveloped data package for the device from the remote server, vi) receiving, at the remote server, requests for enveloped data packages from each device indicated in the trusted device list other than the first device, and vii) transmitting one of the enveloped data packages from the remote server in response to each of the requests, by identifying a requesting device from which the request was received, and transmitting, to the requesting device, the one of the enveloped data packages containing the encrypted version of the random key generated using the public key of the requesting device; and
accessing the protected resource by the second device, using a decrypted version of the access token.

2. The method of claim 1, further comprising:
wherein the confirmation request includes the passphrase data from the new device; and
wherein comparing the passphrase data received from the new device to the passphrase data input to one of the devices indicated in the trusted device list is performed at the one of the devices indicated in the trusted device list at which the passphrase data was input.

3. The method of claim 1, wherein the passphrase data from the new device is represented in the request by a message authentication code based on passphrase data input to the new device, and further comprising:
  generating, by the one of the devices indicated in the trusted device list that input passphrase data, a message authentication code based on the passphrase data input to the one of the devices indicated in the trusted device list; and
  wherein comparing the passphrase data received from the new device to the passphrase data input to one of the devices indicated in the trusted device list includes comparing the message authentication code based on passphrase data input to the new device with the message authentication code based on the passphrase data input to the one of the devices indicated in the trusted device list.

4. The method of claim 1, wherein the protected resource comprises a secure application, and further comprising:
  wherein obtaining the access token by the first device is part of establishing an authenticated session with the secure application for the resource owner;
  wherein accessing the protected resource by the second device includes
    i) detecting that the resource owner is requesting a connection with the secure application from the second device,
    ii) locating, in response to the resource owner requesting a connection with the secure application from the second device, a copy of the access token obtained by the first device and stored in the second device, and
    iii) using the copy of the access token stored in the second device to access the secure application from the second device.

5. The method of claim 1, further comprising:
  detecting, in response to receipt of one of the requests for the access token from one of the devices indicated in the trusted device list other than the first device, that the access token has expired; and
  in response to detecting that the access token has expired, returning an error code to the device from which the request was received.

6. The method of claim 1, wherein obtaining the access token for the protected resource includes obtaining a refresh token operable to obtain a new access token for the protected resource; and
  wherein synchronizing the access token with the devices indicated in the trusted device list other than the first device includes securely transmitting a copy of the refresh token to each of the trusted devices indicated in the trusted device list other than the first device.

7. A computer program product having a non-transitory computer readable medium which stores a set of instructions operable to synchronize an access token across multiple devices, the set of instructions, when executed, performing the steps of:
  generating a trusted device list for a resource owner, the trusted device list storing indications of devices trusted by the resource owner, the trusted device list indicating at least a first device trusted by the resource owner and a second device trusted by the resource owner, wherein the trusted device list for the resource owner is generated at least in part by adding a device to the trusted device list by i) receiving a request from a new device, the new device not indicated in the trusted device list, wherein the request includes passphrase data from the new device, ii) in response to the request from the new device, transmitting a confirmation request to each of the devices indicated in the trusted device list, the confirmation request causing one of the devices indicated in the trusted device list to input passphrase data, iii) comparing the passphrase data received from the new device to the passphrase data input to one of the devices indicated in the trusted device list, and iv) adding the new device to the trusted device list in response to the passphrase data received from the new device matching the passphrase data input to one of the devices indicated in the trusted device list;
  inputting, by the first device trusted by the resource owner, an authorization grant from the resource owner;
  obtaining, by the first device using the authorization grant, an access token for a protected resource, wherein the access token includes credentials for accessing the protected resource;
  synchronizing the access token with the devices indicated in the trusted device list other than the first device by securely transmitting a copy of the access token to each of the trusted devices indicated in the trusted device list other than the first device, wherein securely transmitting a copy of the access token to each of the trusted devices indicated in the trusted device list other than the first device includes i) generating an encrypted version of the access token by encrypting the access token using a random data encryption key, ii) generating an encrypted version of the random data encryption key for each one of the devices indicated in the trusted device list other than the first device by encrypting the random data encryption key with a public key associated with the device, iii) creating an enveloped data package for each of the devices indicated in the trusted device list other than the first device, the package for each device containing the copy of the encrypted version of the access token and the encrypted version of the random data encryption key, iv) transmitting the enveloped data packages to a remote server, v) transmitting a notification to each device indicated in the trusted device list other than the first device, the notification indicating to the device that the device is to retrieve the enveloped data package for the device from the remote server, vi) receiving, at the remote server, requests for enveloped data packages from each device indicated in the trusted device list other than the first device, and vii) transmitting one of the enveloped data packages from the remote server in response to each of the requests, by identifying a requesting device from which the request was received, and transmitting, to the requesting device, the one of the enveloped data packages containing the encrypted version of the random key generated using the public key of the requesting device; and
  accessing the protected resource by the second device, using a decrypted version of the access token.

8. The computer program product of claim 7, wherein the confirmation request includes the passphrase data from the new device; and
  wherein the set of instructions, when carried out by computerized circuitry, causes the computerized circuitry to compare the passphrase data received from the new device to the passphrase data input to one of the devices indicated in the trusted device list at the one of the devices indicated in the trusted device list at which the passphrase data was input.

9. The computer program product of claim 7, wherein the passphrase data from the new device is represented in the request by a message authentication code based on passphrase data input to the new device, and wherein the set of instructions, when executed, further performs the steps of:
   generating, by the one of the devices indicated in the trusted device list that input passphrase data, a message authentication code based on the passphrase data input to the one of the devices indicated in the trusted device list; and
   comparing the passphrase data received from the new device to the passphrase data input to one of the devices indicated in the trusted device list by comparing the message authentication code based on passphrase data input to the new device with the message authentication code based on the passphrase data input to the one of the devices indicated in the trusted device list.

10. A system for synchronizing an access token across multiple devices, comprising:
   a first device including at least one processor and memory;
   a remote server including at least one processor and memory;
   wherein the first device is trusted by a resource owner and is configured to
      generate a trusted device list for the resource owner, the trusted device list storing indications of devices trusted by the resource owner, the trusted device list indicating at least the first device and a second device trusted by the resource owner, and is further configured to i) receive a request from a new device, the new device not indicated in the trusted device list, wherein the request includes passphrase data from the new device, ii) in response to the request from the new device, transmit a confirmation request to each of the devices indicated in the trusted device list, the confirmation request causing one of the devices indicated in the trusted device list to input passphrase data, iii) compare the passphrase data received from the new device to the passphrase data input to one of the devices indicated in the trusted device list, and iv) add the new device to the trusted device list in response to the passphrase data received from the new device matching the passphrase data input to one of the devices indicated in the trusted device list,
      input an authorization grant from the resource owner,
      obtain, using the authorization grant, an access token for a protected resource, wherein the access token includes credentials for accessing the protected resource, and
      synchronize the access token with the devices indicated in the trusted device list other than the device by securely transmitting a copy of the access token to each of the trusted devices indicated in the trusted device list other than the device, and is further configured to i) generate an encrypted version of the access token by encrypting the access token using a random data encryption key, ii) generate an encrypted version of the random data encryption key for each one of the devices indicated in the trusted device list other than the first device by encrypting the random data encryption key with a public key associated with the device, iii) create an enveloped data package for each of the devices indicated in the trusted device list other than the first device, the package for each device containing the copy of the encrypted version of the access token and the encrypted version of the random data encryption key, and iv) transmit the enveloped data packages to a remote server; and
   wherein the remote server is configured to
      i) transmit a notification to each device indicated in the trusted device list other than the first device, the notification indicating to the device that the device is to retrieve the enveloped data package for the device from the remote server, ii) receive requests for enveloped data packages from each device indicated in the trusted device list other than the first device, and iii) transmit one of the enveloped data packages in response to each of the requests, by identifying a requesting device from which the request was received, and transmit, to the requesting device, the one of the enveloped data packages containing the encrypted version of the random key generated using the public key of the requesting device, and
   wherein securely transmitting the copy of the access token obtained by the device to each of the trusted device indicated in the trusted device list other than the device enables the second device to access the protected resource using a decrypted version of the access token.

* * * * *